United States Patent
Clynes

[15] 3,691,652
[45] Sept. 19, 1972

[54] PROGRAMMED SYSTEM FOR EVOKING EMOTIONAL RESPONSES

[72] Inventor: Manfred E. Clynes, Lawrence Lane, Palisades, N.Y. 10964

[22] Filed: June 1, 1971
[21] Appl. No.: 148,428

[52] U.S. Cl. .................................35/22 R, 128/2 N
[51] Int. Cl. ...........................................G09b 19/00,
[58] Field of Search..........35/22 R; 128/2.1 R, 2.1 B, 128/205 R, 2 N

[56] References Cited

UNITED STATES PATENTS 2,379,955  7/1945  Eilenberger.............128/2.1 R
2,678,692  5/1954  Ranseen......................35/22 R Primary Examiner—Wm. H. Grieb
Attorney—Michael Ebert

[57] ABSTRACT

In order to enhance the ability of a subject to freely express emotion and to overcome inhibitive and repressive tendencies, a system is provided adapted to generate generalized emotional states by way of repeated random signal initiation and expressive touch. By going through a sequence of generalized emotion states (sentic states) in a programmed manner, the subject completes a sentic cycle. It has been found that such sentic cycles serve to relieve certain psychosomatic disorder symptoms.

7 Claims, 3 Drawing Figures

PATENTED SEP 19 1972  3,691,652
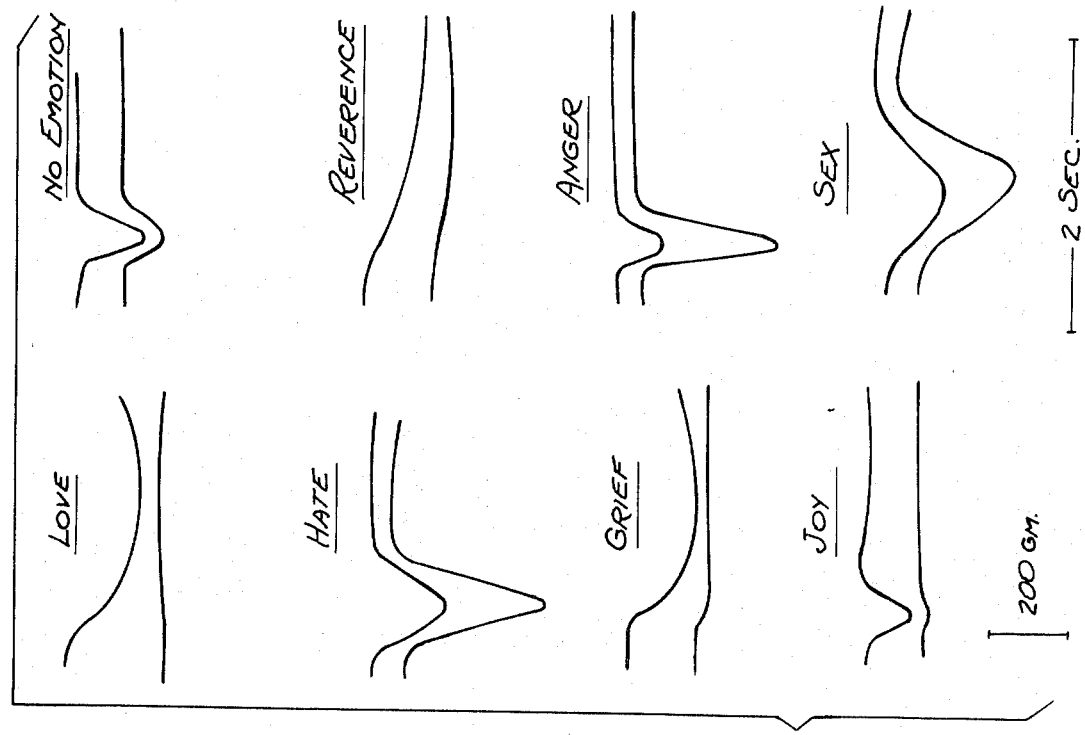
Fig. 2.
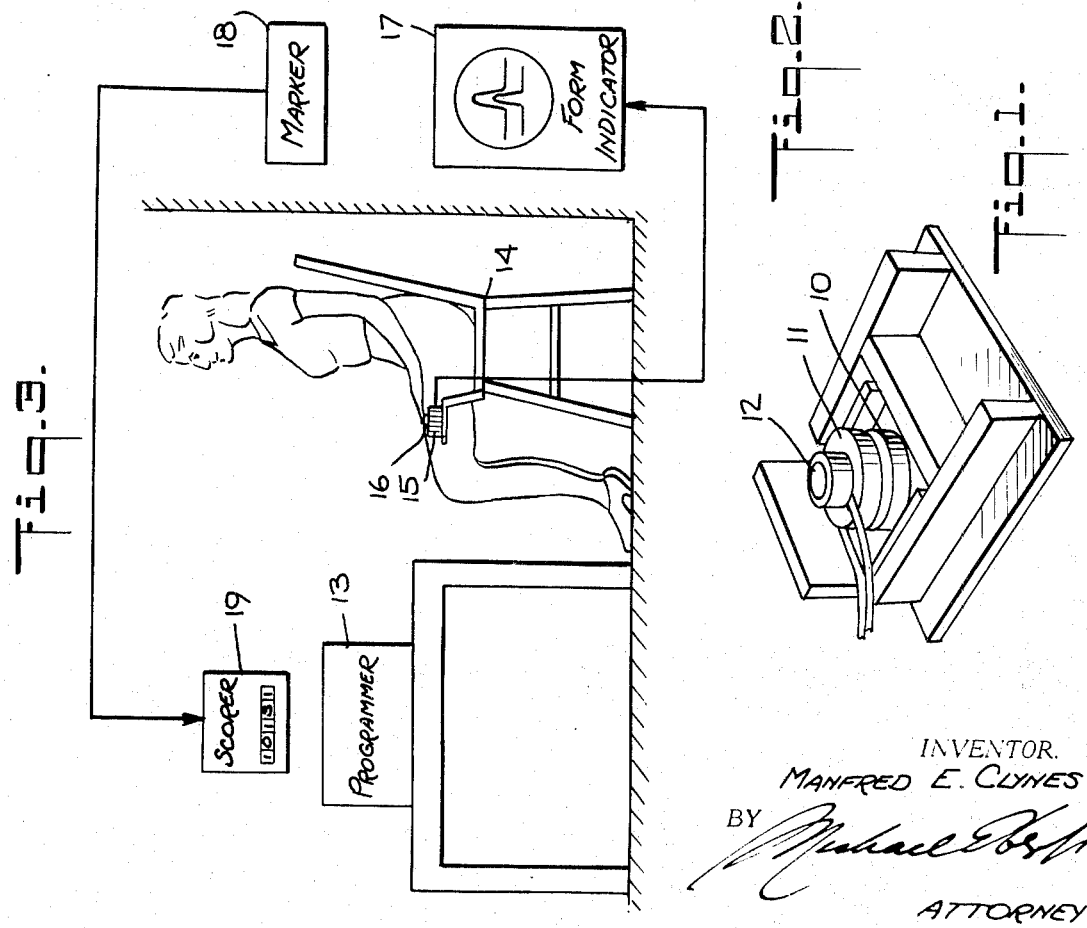
Fig. 1.
Fig. 3.
INVENTOR.
MANFRED E. CLYNES
BY
ATTORNEY

PROGRAMMED SYSTEM FOR EVOKING EMOTIONAL RESPONSES

BACKGROUND OF THE INVENTION

This invention relates generally to mental therapy techniques and apparatus therefor, and in particular to a programmed system for evoking in a subject a series of generalized emotional states which are expressed in tactile terms to create an emotional release having beneficial effects.

According to psychoanalytic and psychiatric theories of repression, deformation of character structure and neurosis may be linked to the inability or the unconscious refusal of a subject to express emotion at critical periods as well as in every day life. The concern of the present invention is with the relief from psychosomatic disorder symptoms by affording a patient with a natural outlet for emotional expression without the need for acquiring specific skills to attain this end. The utility of the invention is not limited to disturbed subjects, for it may be used to enhance the mental state of normal subjects.

A study of human emotions from the biocybernetic standpoint may be found in the text, "Biomedical Engineering Systems," edited by Clynes and Milsum (McGraw-Hill—1970).

If one examines the physiologic concomitants of emotion, such as changes in heart rate, blood pressure, sweating and similar indices, one finds that a strict one-to-one correspondence is lacking between the changes and the emotion studied. Thus one individual may become pale when angry, another flushed, and even with the same person the physiologic responses are dissimilar at different times. These familiar observations reinforce the mistaken notion that emotions are vague, ill-defined and therefore defy rigorous scientific analysis. This attitude is further promoted by those theories of emotion that primarily define emotion through the physiologic experience of altered body functions.

It is well known that the words of language used to define emotional states are often ambiguous and do not denote many important and subtle aspects of emotion such as its time course, or dynamic aspects in general. Moreover, it is difficult to produce experimental conditions under which emotions are repeatedly and reliably produced in the same individual, or in different individuals. Habituation, expectancy and differences in interpretation interfere with the reproducibility of results.

On the other hand, artists and others with a strongly developed sense of inner discrimination have realized the high degree of precision of aspects of the emotional state and its communication. Such persons often consciously consider these states to be more precise than the words that are available to describe them.

The experimental results and theories presented in the above-identified Clynes and Milsum text, reconcile these conflicting points of view and investigate the sources of precision. It is there demonstrated that the "idiologs" or brain algorithm programs of emotion states are highly precise, as are also the natural communication of expressive forms in the present moment of time.

The concept "idiolog" distinguishes a thought or idea of a quality and the associated brain process, as separate from the perception of it—e.g., the idea of a pitch, as compared with hearing it. The term idiolog denotes the thought or fantasy of a quality as a distinct psychophyiologic reality. An idiolog is an element of imagination which can be created in a moment, and has physiologic brain concomitants. Idiologs constitute a metalanguage of natural language insofar as the words of natural language are a correct translation of the physiologic code. We may distinguish three kinds of idiologs—sensory, affective, and motor idiologs.

The ensuring physiologic response may vary according to how much and what type of autonomic body functions are permitted to be included in the mode of experience concerned. This relationship varies as the nature of the experience partakes of fantasy or real aspects. A person may function emotionally only in terms of fantasy, by empathy or identification, or may be entirely involved himself.

In the studies reported in the above-identified text, the difficulties of measuring emotional characteristics quantitatively were overcome by normalizing expressions of emotion through measurement of touch-pressure transients in two dimensions produced by one finger of the subject, and by using generated fanatasized emotion to evoke a response. By generating repetitive expressive acts for each emotion and averaging these acts on a computer, one derives from the transient pattern created by finger pressure, the expressive shape for the emotion.

The use of a single finger to produce expressive form implies the assumption that there exists a basic brain program for the expression of a given emotion, which makes it essentially immaterial whether a finger, foot or other body part is used in the expression—much as handwriting is also revealed by writing with the foot. The consistent results obtained with this measurement method confirms this supposition.

In order to clarify these aspects, we have introduced the terminology of sentic states. We may distinguish four kinds or modes of sentic states for each emotion.

Thus for the emotion Anger, the following states exist:

Sentic State A. One experiences anger in himself in a real situation.

Sentic State B. This state is experienced as a reflection of anger in another person (a form of empathy).

Sentic State C. Anger is experienced as a fantasy.

Sentic State D. The anger is experienced vicariously through another's fantasy, as in watching theater or a movie, where one realizes the situation is not real.

Each one of these modes of sentic states has its own character and physiologic concomitants.

The expressive forms produced in the measurements previously referred to, are those arising from sentic state-C observations; i.e., the expressions of fantasy emotions. These states have clear physiologic concomitants: there may be tears for grief, flushing of face for love, and so on, and there are systematic alterations in heart rate, respiration and oxygen consumption. But more specifically, their dynamic expression appears to have an underlying basic brain algorithm or program which is genetically determined and similar for humans regardless of race, although the type of output expression chosen is culturally determined.

It is in the nature of emotion that it demands to be expressed. In control-system or bio-cybernetic terms, it means that there exists an inner command which requires a corresponding output to be fulfilled. The command dictates a dynamic form in space-time which must be produced by the output modality. The output modality may be touch, tone of voice, gesture, or another means by which an individual is capable of expressing feeling. If the command is satisfied in this way, a certain experience of "satisfaction" is consciously felt.

The degree of satisfaction depends also on the extent to which the output form accurately represents the inner command shape. To achieve this, the appropriate gates of the data-processing modes of the nervous system must be open. This is experienced as a sense of being "natural" but is often forgotten through disuse, inhibition, or habitual caution.

When one is faithful to the inner command and produces the required expressive shape or "essentic form," it will be found that one also communicates that particular state to another. Our human data-processing system appears to be designed so that the visual, auditory or tactile senses demodulate the signals so as to become dynamic keys to open the data-processing locks of the receiving individual to reconstitute an idiolog form similar to the command sentic state.

Let us now consider the nature of voluntary movement. Studies of separate voluntary eye movements show that they take about 180 msec. to complete. During this time, the movements are not subject to voluntary modification, i.e., they are pre-programmed.

The behavior is similar for the single, natural movement of a finger or other limb or facial musculature. Even the simplest voluntary movement, such as moving a finger, involves programmed starting, accelerating, and decelerating. In order to do this, two sets of muscles must come into operation at the appropriate times and to the appropriate extent in order to start and to stop the motion at the right time and place, as intended. It is a physiologic fact that the course of such a simple movement is pre-programmed by the brain before it begins. Recent studies of J.C. Eccles are relevant to the role of the cerebellum in supervising and modulating the transient course of the action.

There is no time in the 180 msec. period for conscious feedback to affect the decision. There is a decision which precedes the beginning of the movement. This decision is of a precise nature and controls the subsequent movement according to the program it has set (i.e., the decision event pre-programs the subsequent course of the movement). The pre-programming is of the nature of an algorithm.

During approximately 180 msec. after a programming decision is made, another programming decision affecting the same limb or muscle cannot be made. Movements begun under such a decision cannot be reversed or controlled within this time. We call such a pre-programmed voluntary movement having a clear beginning and end, an "acton." An "acton" is the combination of an action idiolog and its execution. The minimum duration of an acton is related to what we experience as the "present moment." In this minimum time, a decision cannot be reversed.

Consider a person deciding to hit a particular spot with a ball. To do so, he has an idea, which is a "command," and his arm and body execute this "command" in a more or less precise way involving accurate programming. To act satisfactorily, he has to have both a clear idea (or action idiolog) and an accurate execution.

In acts of emotional expression, there is a similar, related process. The difference between a "mechanical" movement and an expressive movement, is that the form of the latter is modulated by a state of feeling, or "sentic state", as we call it, functioning as an algorithm. (This modulation may increase the duration of pre-programming, depending on the sentic state).

There is in every act of emotional expression, a moment of initiation. In this moment, the individual makes a choice or decision to express or not express. In that moment, he must open all those gates in his data-processing system which will allow the program of expression to command the expression, if the expression is to be "faithful" or "sincere." The degree to which this is done determines the faithfulness of the expressions to the inner command shape—and gives rise to the impression of "depth of feeling."

At the moment of initiation, the shape of expression is already determined, that is to say, the contour between the beginning and end of the expressive unit of action is designed. This moment is then of great importance. The process which takes place in the brain during this time determines the nature of the entire expressive action.

Expressive action has no other aim than to respond and correspond to an inner state. Such action is composed of actons, but the shape of these actons (E-actons) is modulated by the state commanding or seeking expression, which we call the "sentic state." We say that the sentic state (or the idiolog of the sentic state), requires the E-acton to have a certain characteristic shape, e.g., sadness will change the shape in time-space of an undifferentiated movement to a new shape if we allow it to express sadness. We call this the "essentic form." Similarly, joy will cause the movement to be modulated to a different characteristic form corresponding to joy.

SUMMARY OF THE INVENTION

The main object of this invention is to provide a technique for evoking a sequence of generalized emotional responses in a subject in order to afford the subject with an emotional release having therapeutic effects.

More specifically, it is an object of this invention to provide a system for the psychological treatment of a subject, the system being adapted to generate generalized emotional states in the subject by means of a programmer presenting to the subject a series of words denoting emotions to be expressed, each word being followed by a series of start signals occurring at random points to initiate responses.

Still another object of the invention is to provide a system of the above type which may be used effectively by the subject without supervision or control or which may be used under the control of a trained therapist to derive beneficial effects.

Yet another object of the invention is to provide a programmed system based on the theory of essentic forms, which system may be manufactured at low cost and made widely available for therapeutic purposes.

Briefly stated, these objects are accomplished in a system including a programmer functioning by means of a recording in audio or visual form, or a combination thereof, to present a subject being treated with a timed sequence of words, each denoting a specific emotion, the sequence of words preferably being such as to first define a series of negative emotions and progressing to a series of positive emotions, each word being followed by a series of randomly produced start signals to cause the subject each time the signal is received, to apply a pressure with a body member in a manner which is best expressive of the announced emotion, the subject thereby undergoing and generating a sequence of sentic states in a programmed cycle.

The pressure applied by the subject may be presented in transient pattern form, having horizontal and vertical components, which form is exhibited to the subject or to a trained analyst to indicate whether an appropriate emotion has been expressed. Means may be provided under the control of the analyst to indicate the effectiveness of the response and to obtain a score representing the emotional progress made by the subject.

OUTLINE OF THE DRAWING

For a better understanding of the invention as well as other objects and further features thereof, reference is made to the following detailed description to be read in conjunction with the accompanying drawing, wherein:

FIG. 1 is a perspective view of a transducer assembly used in a programmed system in accordance with the invention for therapeutic treatment of subjects;

FIG. 2 is a series of transient patterns representing typical essentic forms, and FIG. 3 is a block diagram of a preferred embodiment of a system in accordance with the invention.

DESCRIPTION OF THE INVENTION

Before considering how a system in accordance with the invention functions to promote emotional freedom and to thereby relieve depression or other neurotic conditions, we shall first review briefly the nature of essentic forms and the manner in which they have heretofore been measured.

Since the commands of the brain determine expressive shapes, it became possible to eliminate the difficult and varied measurement techniques presented by the different output possibilities (e.g., a smile, head movement, eyebrow movement, etc.) by standardization of the output in the form of a transient pressure touch (middle finger) on a two-dimensional pressure transducer assembly, as shown in FIG. 1. When this is done, results are indeed consistent and comparable, indicating the stability of the brain phenomenon giving rise to the shape.

The assembly shown in FIG. 1 is constituted by two pressure transducers 10 and 11, mounted at right angles to one another so as to have no cross interference, the pressure being applied to the transducers by a finger rest 12. Finger rest 12 is of a material having "grey" characteristics, that is a material affording a neutral touch sensation, i.e., neither particularly soft nor hard, neither particularly smooth nor rough. For this purpose, use may be made of a cup-shaped plastic body having a slight yieldability.

The transducer measuring horizontal force is biased with a constant pressure so that horizontal pressure measured may be either positive or negative, without losing contact. The transducers may be of the type used for pulse pressure measurement or may take the form of strain gauges. In practice, the finger rest may be formed with a socket or receptacle to receive an inserted finger, so that the transducer then may respond to upward as well as downward finger movement.

The subject in sitting position presses on the pressure transducer finger rest with his finger. (The particular limb chosen does not essentially matter—the essentic form is a brain program, and can be executed by various effectors, such as the foot. For standardization, however, one should always use the same finger to eliminate secondary effects. Two components of this pressure are recorded (vertical and horizontal) giving time profiles of instantaneous pressure. This is the measure of the essentic form. The arm as a biologic filter eliminates activity not concerned with the form of the expressive act.

The subject is instructed to express with the greatest precision the quality of a sentic state given in word approximations (e.g., hate, anger, grief, love, sex, joy, reference) by pressing the finger rest. The times at which he is to express a given state is given to him by a series of soft clicks occurring randomly at 2–8 sec. intervals. The corresponding essentic form outputs, i.e., the transient shapes recorded, are averages on a CAT computer (computer of average transients).

In this measurement process, the individual, by suggesting an approximate word, is asked to generate in himself an algorithm—an idiolog of a sentic state—and repeatedly to express this with each acton in as precise a manner as possible.

It has been found that the act of expressing essentic form itself has an effect on the sentic state. This is a direct, positive feedback which teaches the subject both to increase the precision of his essentic form and to be more aware of the quality of the sentic state. This means that the process is self-teaching and self-refining. In doing it, we appear to learn to sense a pure or "ortho-essentic" form toward which we practice as a reference.

While the conventional meaning of the word "learning" involves newly formed memory, this appears more like discovering what we already inherently are, and have perhaps neglected to cultivate. At first, the subject usually imagines particular situations to focus on a certain sentic state; but he is soon able to experience and express the state without specific situational imagery—and in doing so, new imagery may also spontaneously arise.

FIG. 2 shows various essentic forms of emotions recorded in the manner described above. The upper trace for each emotion (Love, Hate, Grief, Joy, No Emotion, Reverence, Anger, Sex) is the vertical component of transient pressure. The lower trace is the horizontal component. Each form is measured as the average of fifty actons. The fact that different emotions give rise to different forms, is evident from the figure.

In order to exploit sentic forms for the purpose of emotional therapy, a system as shown in FIG. 3 is provided. This system is constituted by a programmer 13 which may take the form of a standard magnetic tape recording and play-back machine in cassette form.

It was found useful to take a sequence of sentic states, each to be experienced by a number of actons, initiated at random times from an outside signal. A tape provides these signals in the form of soft clicks and announces each sentic state with one word. Thus prerecorded on the cassette tape at spaced time positions are individual words such as anger, grief, love, etc., each word being followed by a series of soft command clicks occurring randomly, say at 3 to 15 second intervals, to avoid rhythmic actions that interfere with a spontaneous response. It is important that the clicks be neutral in character, that is, free of irritating or distracting qualities, so that the clicks merely initiate but do not affect the actions.

A patient being treated is seated in a chair 14 having mounted thereon a pressure transducer assembly 15 provided with a finger rest 16. The proper positioning requires an upright position, with a straightback chair, perhaps a pillow behind the back, and a straight back. This has kinesthetic reasons, as well as preventing muscle tiredness. The body position was found to be an important factor influencing the effect of sentic cycles. It has little effect in an inclined or supine position.

Preferably, the programmer begins the sequence with negative states, such as anger and hate, and through grief (which combines both with negative and positive states) arrive at positive states, such as love, followed by sex, joy and reverence, thereby completing one cycle. Two cycles are usually done, taking about 50 minutes. The second cycle usually is experienced more fully.

This programmed sequence is in accord with the findings of vector space, determined from the horizontal components of essentic form, which denotes the possible combinations of sentic states. Accordingly, in the sequence of states in the sentic cycle, one generally proceeds according to connected regions in vector space, rather than by jumping abruptly from positive to negative.

It has been found that such a sentic cycle does produce a sense of calmness, a relatedness and sometimes a measure of insight. It is a satisfaction in itself, that one is able to summon up various sentic states at will, and express them without fear, or embarrassment. Even though one acts only with one finger (though the action originates from the shoulder and trunk), one acts freely, and each act brings its own minor satisfaction.

There is, however, a long-term habituative effect to which sentic cycles are not immune. The same sequence practiced in the same way each day for an hour or more tends to become boring after some weeks. To minimize this, one searches for the optimum frequency, perhaps every second day, and also for a way of varying the sequence and specific states chosen. For this purpose, several cassettes may be provided, each recording a distinctive sentic cycle.

Studies with certain psychosomatic disorders show promise in the relief of nervous ticks, stammer and asthma. Potential applications are numerous, but should be done under appropriate medical supervision (reduction in stage fright and nervousness in public appearances is another application of some 15 to 30 minutes of sentic cycles beforehand). After a person has completed a number of such cycles, we often observe a surprising change in his general mental state—an increasing awareness, fluidity of thought and a feeling of well-being.

Sentic cycles generally have a calming effect and produce a lessening of anxiety. These effects generally last from 3 to 24 hours. There frequently appears a marked increase in psychic energy and physical activity after the initial period of calmness. (Some of this may simply be related to the removal of anxiety). Prolonged sentic cycle activity of seven or eight hours continuously is generally not tiring but refreshing and appears to reduce the subsequent need for sleep. Improvement in the restfulness of sleep has also been noted in many instances. Many subjects have compared the experience following sentic cycles to being "high" from drugs such as Marijuana. Some of the cathartic effect is related to the old adage of chopping wood to "work off" anger. But it is the quality of the expressive act—not the quantity of physical energy in it—that is effective in discharging the anger. Thus the repeated angry movement of a finger to a certain extent is equivalent to the repeated angry movement of chopping wood.

The state is very different from hypnosis in that the subject is in full control all the time. Heart rate and respiration vary systematically with the sentic states as well as oxygen consumption. Some subjects often cry during the state of grief. Sentic cycles improve the fluidity of the mental state and the condition of sentic rigidity, which is one of the symptoms of depression, is alleviated.

The subject, when going through a cycle, has no objective means of knowing whether he is effectively expressing the emotions announced by the programmer. All that he has available is his subjective reactions. However, by the use of a transducer assembly 15 coupled to an oscilloscope 17 or other known on-time means for presenting the horizontal and vertical pressure components on a viewing screen, the subject is then able to see the actual transient pattern or sentic form of his response.

Though the subject is not trained to analyze these transient patterns, he will, in the course of time, learn to recognize these sentic forms resulting from the absence of an emotional response, or a poor response as distinguished from the form arising from a genuine, well-defined feeling. Thus the subject, as he gains experience with the system with repeated treatments, is able, by viewing the screen, to confirm those instances in the cycle in which he has effectively experienced a sentic state. These confirmations serve to bolster the confidence of the subject in his responses and act to encourage the subject toward greater freedom in reacting to the programmed cycle. Thus the transient pattern indicator 17 functions to stimulate the subject and to reinforce his participation in the program.

In practice, the programmer 13 and visual indicator 17 may be combined into a single audio-visual unit in which the words in the cycle are presented on a cathode ray screen. For this purpose, a video tape cassette may be used in conjunction with a television set having a sound system to provide the random audio start signals to initiate responses to words presented on the screen. The same screen is used to exhibit the resultant transient patterns. This arrangement affords the subject immediate feedback which may improve his motivation and enhance the benefit obtained from the treatment.

Observation of the sentic forms may be carried out by a trained analyst who is capable of correlating the presented forms with specific emotion states, thereby to determine whether an appropriate response has been made. The analyst, upon seeing that a proper response has been made, may then operate a marker switch 18 linked to a scorer or indicator device 19 functioning to indicate that a correct response has been given by the subject. Incorrect or negative responses are not scored, so that the subject is only made aware of positive reactions.

This arrangement is predicated on operant reinforcement theory. When an action is correct, this leads to positive reinforcement, for it encourages a repetition of continued behavior leading to further correct actions. Since the scorer does not indicate failed responses, the subject is not motivated to repeat such behavior which then becomes less frequent.

The analyst, by keeping records of the scores made by the subject in the course of treatment, is able to determine whether progress has been made.

While there have been shown and described preferred embodiments of techniques and systems for evoking emotional responses in accordance with the invention, it will be appreciated that many changes and modifications may be made therein without, however, departing from the essential spirit of the invention. Thus, in lieu of an analyst to score the subject's responses, this operation may be computerized by means of a memory system storing standardized essentic forms, and a comparator to determine when the form actually generated by a subject, is an acceptable match for the standardized form. These standardized forms in recorded form may be derived from the subject himself by averaging techniques, or they may be general in nature.

Also in a T-V system, standardized recorded essentic forms may be presented on the screen for comparison with the transient patterns generated by the subject.

I claim:

1. A system for evoking a series of generalized emotional responses in a subject to cause the subject to complete a sentic cycle having a therapeutic effect; said system comprising:
   A. a programmer adapted to present to the subject a timed sequence of words, each denoting a specific emotion, each word being followed by a series of start signals occurring at random times, said start signals commanding the subject to express the denoted emotion, and
   B. a pressure receiver having a finger rest possessing neutral characteristics, which rest is adapted to receive a finger of the subject who presses thereon each time a signal is received in a manner expressive of the denoted emotion, whereby when responses have been made to all words in the sequence thereof, the subject completes a sentic cycle.

2. A system as set forth in claim 1, wherein said programmer is an audio play-back device and includes a record of said words and said signals, said signals being constituted by audible clicks.

3. A system as set forth in claim 1, wherein said pressure receiver is a transducer assembly having horizontal and vertical pressure responsive elements operatively associated with said finger rest and indicator means coupled to said assembly to present the transient pattern developed by said elements.

4. A system as set forth in claim 3, further including a numerical counter, and switch means coupled to said counter, whereby an observer of said indicator means may score the responses of the subject.

5. A system as set forth in claim 1, wherein said programmer is a television set operating in conjunction with a video tape recording having recorded thereon said sequence of words and visually presented on a screen, said television set having a sound system to produce said start signals in audible form.

6. A system as set forth in claim 1, further including a straight-back armless chair for accommodating the subject, said chair having a bracket onto which said pressure receiver is mounted at a position convenient to the middle finger of one hand of the subject.

7. A system as set forth in claim 5, further including a sensory device containing standardized essentic forms related to the words in said sequence, and means to present each form on said screen.

* * * * *